United States Patent [19]

Chaiko et al.

[11] Patent Number: 5,411,149
[45] Date of Patent: May 2, 1995

[54] AQUEOUS BIPHASIC EXTRACTION PROCESS WITH PH AND PARTICLE CONTROL

[75] Inventors: David J. Chaiko, Woodridge; R. Mensah-Biney, Downers Grove, both of Ill.

[73] Assignee: ARCH Development Corporation, Argonne, Ill.

[21] Appl. No.: 928,790

[22] Filed: Aug. 11, 1992

[51] Int. Cl.⁶ .................. B03B 5/30; C01B 33/12
[52] U.S. Cl. ..................... 209/172.5; 423/340; 588/1; 976/DIG. 380; 976/DIG. 392
[58] Field of Search ............ 423/1, 340; 209/172.5; 588/1; 976/DIG. 380, DIG. 392

[56] References Cited

U.S. PATENT DOCUMENTS

| | | | |
|---|---|---|---|
| 4,005,009 | 1/1977 | Kinoshita et al. | 210/705 |
| 4,323,459 | 4/1982 | Quinlan | 210/700 |
| 4,417,985 | 11/1983 | Keane | 210/700 |
| 4,466,886 | 8/1984 | Petrovich | 210/707 |
| 4,628,042 | 12/1986 | Speronello | 423/327.1 |
| 4,681,750 | 7/1987 | Johnson et al. | 209/166 |
| 4,725,358 | 2/1988 | Ananthapadmanabham | 423/339 |
| 4,744,892 | 5/1988 | von Rybinski et al. | 209/167 |
| 4,765,834 | 8/1988 | Ananthapadmanabhan et al. | 423/8 |
| 4,765,913 | 8/1988 | Featherstone | 204/119 |
| 4,789,446 | 12/1988 | Von Röpenack et al. | 204/119 |
| 4,802,993 | 2/1989 | Katoh | 210/725 |
| 4,832,937 | 5/1989 | McIntyre et al. | 423/573.1 |
| 4,880,529 | 11/1989 | Bulatovic et al. | 209/167 |
| 4,915,818 | 4/1990 | Yan | 208/251 R |
| 4,929,274 | 5/1990 | Luttinger | 423/25 |
| 5,034,137 | 7/1991 | Okamoto et al. | 210/725 |
| 5,049,285 | 9/1991 | Somerville et al. | 210/710 |
| 5,087,371 | 2/1992 | Morris et al. | 210/643 |
| 5,120,447 | 6/1992 | Christian | 210/714 |

OTHER PUBLICATIONS

"Beneficiation of Pu-Residues," D. J. Chaiko et al., posters presented at the 7th Symposium on Separation Science and Technology for Energy Applications, Oct. 20-24, 1991 in Knoxville, Tennessee.

"Kaolin: Processing, Properties and Applications," M. S. Prasad et al., Applied Clay Science, 6 (1991), pp. 87-119.

Primary Examiner—José G. Dees
Assistant Examiner—Joseph Conrad
Attorney, Agent, or Firm—Reinhart, Boerner, Van Deuren, Norris & Rieselbach

[57] ABSTRACT

A process for aqueous biphasic extraction of metallic oxides and the like from substances containing silica. Control of media pH enables efficient and effective partition of mixture components. The inventive method may be employed to remove excess silica from kaolin clay.

9 Claims, 2 Drawing Sheets

AQUEOUS BIPHASIC EXTRACTION PROCESS WITH PH AND PARTICLE CONTROL

CONTRACTUAL ORIGIN OF THE INVENTION

The United States Government has rights in this invention pursuant to Contract No. W-31-109-ENG-38 between the U.S. Department of Energy and The University of Chicago, representing Argonne National Laboratory.

BACKGROUND OF THE INVENTION

The present invention is concerned generally with aqueous biphasic extraction processes. More particularly, the invention is concerned with controlling particle size and/or pH levels to control the separation behavior of silica in aqueous biphasic extraction processes.

Aqueous biphasic extraction processes are heterogeneous liquid/liquid systems that result from the use of immiscible combinations of inorganic salts and water-soluble polymers, such as polyethylene glycol. Colloid-size particles that are suspended in an aqueous biphasic system will partition to one of the two immiscible phases, depending on a complex balancing of particle interactions with the surrounding solvent. With regard to waste treatment applications, aqueous biphasic systems are similar to conventional solvent extraction. However, aqueous systems do not utilize an organic diluent which may itself become a source of pollution. While biphasic separation processes are known, there still remain substantial problems in separating particular substances. For example, silica-based substances are considered impurities in numerous common substances, such as clays. Historically, efficient and inexpensive removal of excess silica (which can coexist as a separate phase in a mechanical mixture with silica chemically bonded to desirable materials) from desirable materials, such as kaolin clay in particular, has been unavailable.

It is therefore an object of the invention to provide an improved biphasic aqueous extraction process.

It is a further object of the invention to provide a novel method of separating silica from other materials.

It is another object of the invention to provide an improved aqueous biphasic extraction system for separating silica from other materials.

It is yet a further object of the invention to provide an improved method of separating silica from materials using precise pH control of an aqueous biphasic extraction process.

It is still another object of the invention to provide a novel method of separating silica, metallic oxides and other metallic compounds utilizing control of pH and particle size in combination.

Further objects and advantages of the present invention, together with the organization and manner of operation thereof, will become apparent from the following detailed description of the invention when taken into conjunction with the accompanying drawings.

DETAILED DESCRIPTION OF THE PREFERRED EMBODIMENT

Figure 1:
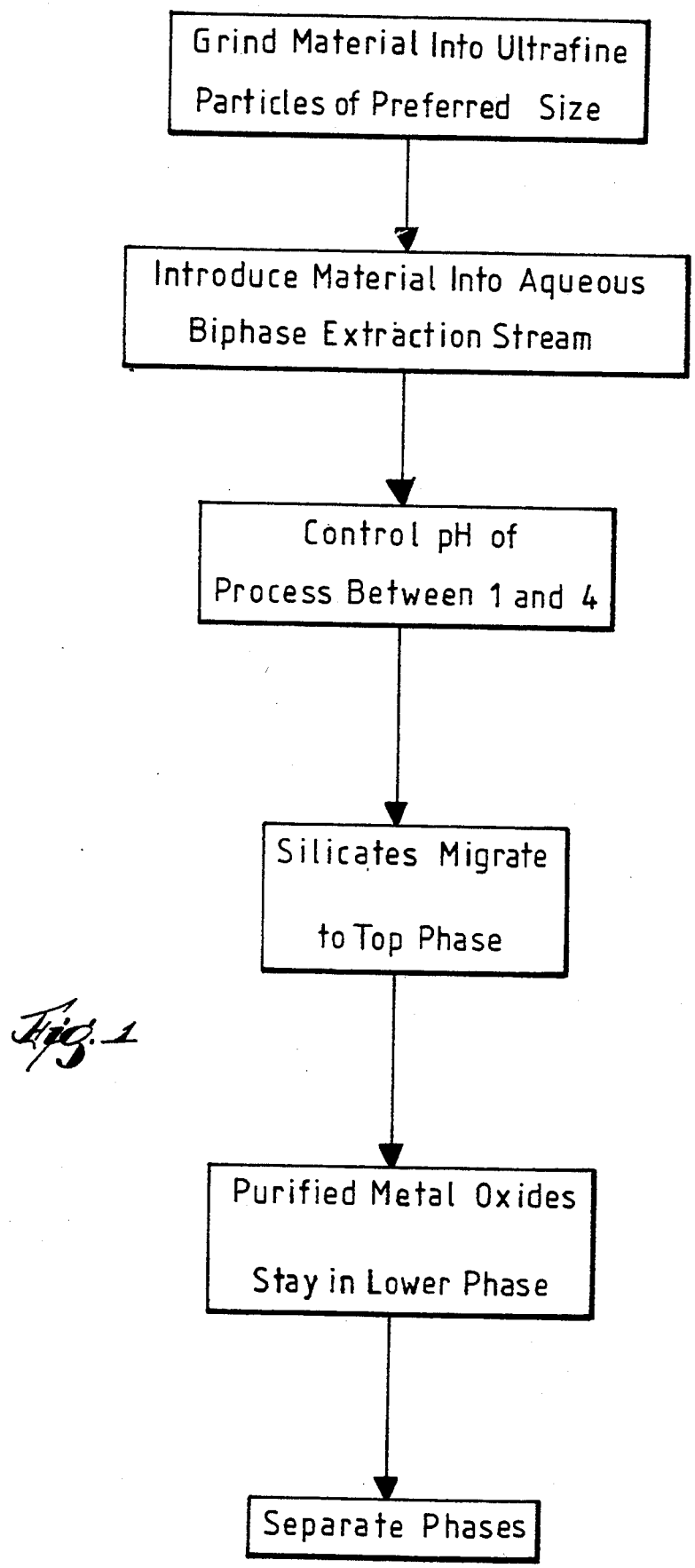
FIG. 1 illustrates an aqueous biphasic extraction process controlled in accordance with one aspect of the invention to separate silica from metal oxides.
Figure 2:
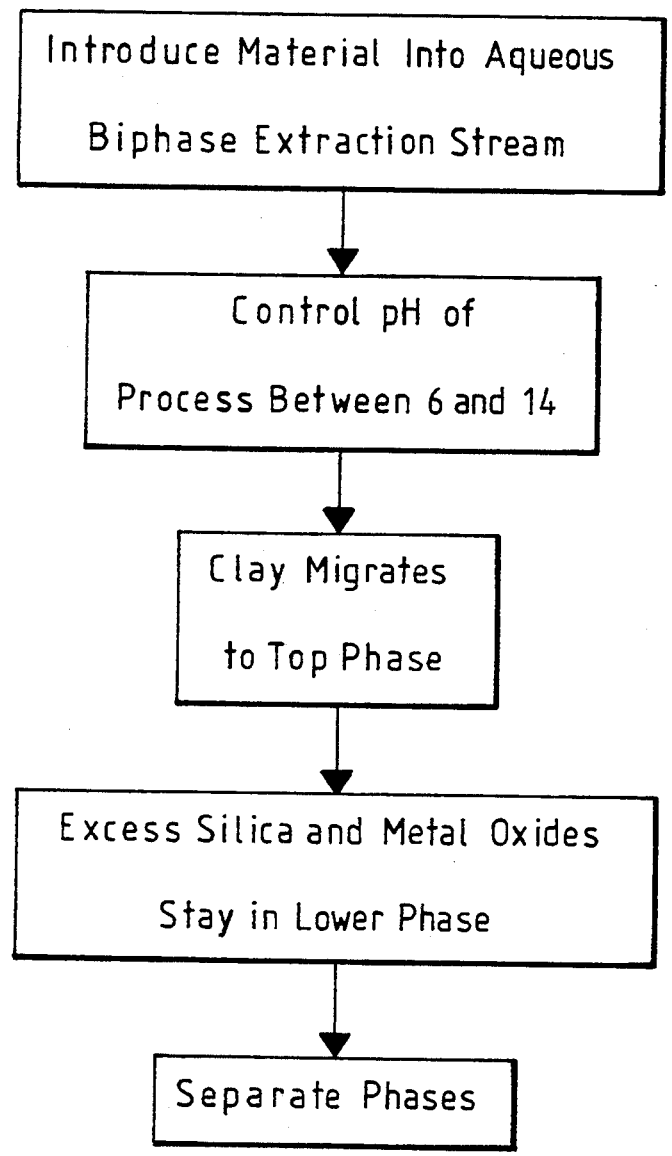
FIG. 2 shows an aqueous biphasic extraction process controlled in accordance with another aspect of the invention to separate excess silica from kaolin clay.

Referring to the figures, and more particularly to FIG. 1, an aqueous biphasic extraction method controlled in accordance with the invention is shown in the form of a flow diagram. In accordance with one aspect of the invention, the general concept of extraction of metallic compounds will be described with reference to an illustrative metal oxide example, extraction of colloidal plutonium oxides.

Many plutonium residues are heterogeneous and, therefore, are amenable to physical beneficiation techniques. Such plutonium residues contain plutonium oxides which are often embedded in a complex matrix of silicates. However, particle size reduction of the plutonium residues, such as by ultrafine grinding, can be used to liberate the plutonium oxides from the matrix of the waste material. This grinding operation can be performed by a variety of commercially available devices. Once liberated, an aqueous biphasic extraction process can be used to separate and recover the plutonium oxides.

As a nonlimiting example of plutonium extraction, separation of plutonium oxides from a silica-based substance will be described. An aqueous biphasic extraction process utilized a first phase of 15% polyethylene glycol (PEG) with a molecular weight of 3400 and a second phase of 7.5% sodium sulfate ($Na_2SO_4$). It will be obvious to one skilled in the art that a wide variety of starting phase constituents can be used in the biphasic process, including, but not limited to, sodium carbonate (which reduces environmental concerns) and sodium phosphate. The silica matrix containing the plutonium oxides was introduced into the starting phase constituents to commence the aqueous biphasic extraction process.

In one form of the invention the Applicants have determined that when the starting phase constituents of the above-described aqueous biphasic extraction process are controlled to a pH level of 3, greater than 99% of the plutonium oxide particles reported to the bottom sodium sulfate phase. At the same time greater than 99.99% of the silica particles reported to the top (PEG) phase.

Applicants have determined that silica migration between the two phases of the aqueous biphasic extraction system can be controlled by pH alone. This feature enables efficient and relatively inexpensive separation of the silica from the metal oxides and like compounds. In another aspect of the preferred invention, the pH range of the starting constituents of the aqueous biphasic extraction system are controlled to pH levels between 6 and 8. Applicants have determined that the silica migrates to the sodium sulfate (lower) phase at these pH levels.

The paper industry and other commercial industries utilize large amounts of kaolin clay in their paper producing processes. At the present time, certain ore deposits are unusable due to contamination by ultrafine quartz particles. Therefore, kaolin clay, which is contaminated by excess quartz, and which would otherwise be unusable due to the abrasiveness of the quartz contamination, can be purified using an aqueous biphasic extraction system controlled in accordance with Applicants' invention.

In the process of this form of the invention, the quartz-contaminated kaolin clay is introduced into the aqueous phases of the biphasic extraction system. The aqueous phases are controlled to a pH range between 6 and 8, yielding highly effective separation of particulate quartz to the lower sodium sulfate phase. The kaolin clay on the other hand migrates to the PEG phase, and a high degree of separation results. Accordingly, large amounts of kaolin clay deposits which have previously been less valuable commercially can now be commercially exploited after purification in accordance with the invention.

EXAMPLE 1

Separation of a $PuO_2/SiO_2$ mixture was performed using the PEG/sodium sulfate biphase system previously described. Polymeric plutonium (Pu(IV)) was used for testing purposes rather than particulate $PuO_2$. It is expected that the critical surface properties of the plutonium polymer and the $PuO_2$ particles found in the plutonium residues are similar. The surfaces of both contain hydrated Pu—O—Pu and Pu—OH sites and should therefore display similar partitioning behavior. Further, the crystal structure of the polymeric plutonium is identical to particulate $PuO_2$.

As with other metal oxides, polymeric plutonium reported quantitatively to the sulfate layer. Its partition coefficient in the PEG-3400/sodium sulfate system at starting constituent pH levels of about 1-4 is approximately 0.001. During the extraction of polymeric plutonium in the presence of ground amorphous silica, the silica reported to the top phase, leaving the bottom phase with no trace of cloudiness. The size distribution of the ground silica was between about 0.2 and 1.0 microns. Because the bottom phase was clear, the silica concentration in that phase was estimated as less than $10^{-4}$ wt %. Based on the total amount of silica added, slightly greater than 99.99% of the silica had partitioned into the top phase. With greater than 99% of the polymeric plutonium remaining in the bottom phase, a separation factor greater than $10^6$ was obtained in a single stage.

EXAMPLE 2

The same procedure in Example 1 was followed except sodium carbonate solution was substituted for sodium sulfate. Substantially the same degree of separation was achieved.

While preferred embodiments have been illustrated and described, it should be understood that changes and modifications can be made therein without departing from the invention in its broader aspects. Various features of the invention are defined in the following claims.

What is claimed is:

1. A process for aqueous biphasic extraction of excess particulate silica from clay using aqueous extraction phases, comprising the steps of:
    introducing a clay containing said excess particulate silica coexisting with silica chemically bonded to one or more oxides, into said aqueous extraction phases;
    controlling the pH of said aqueous extraction phases between about 6 and 14;
    allowing said clay and silica to separate under the influence of said aqueous extraction phases; and
    removing said particulate silica from said clay.

2. The process according to claim 1, wherein said aqueous biphasic extraction process utilizes at least one inorganic salt in one phase of said aqueous phases.

3. The process according to claim 1, wherein said aqueous biphasic extraction process utilizes polyethylene glycol in one of said aqueous phases.

4. The process according to claim 1, wherein said aqueous biphasic extraction process utilizes polypropylene glycol in one of said aqueous phases.

5. The process according to claim 1, wherein said aqueous biphasic extraction process utilizes a combination of inorganic salts in a first phase and polyethylene glycol in a second phase of said extraction phases.

6. The process according to claim 1, wherein said excess silica comprises quartz.

7. The process according to claim 1, wherein said clay comprises kaolin clay.

8. The process according to claim 1, wherein said pH is controlled between about 6 and 8.

9. The process according to claim 1, wherein said particulate silica has an average diameter of less than about one micron.

* * * * *